Aug. 6, 1940.  J. N. KIEP ET AL  2,210,416
FRICTION CLUTCH
Filed Nov. 25, 1939  3 Sheets-Sheet 2
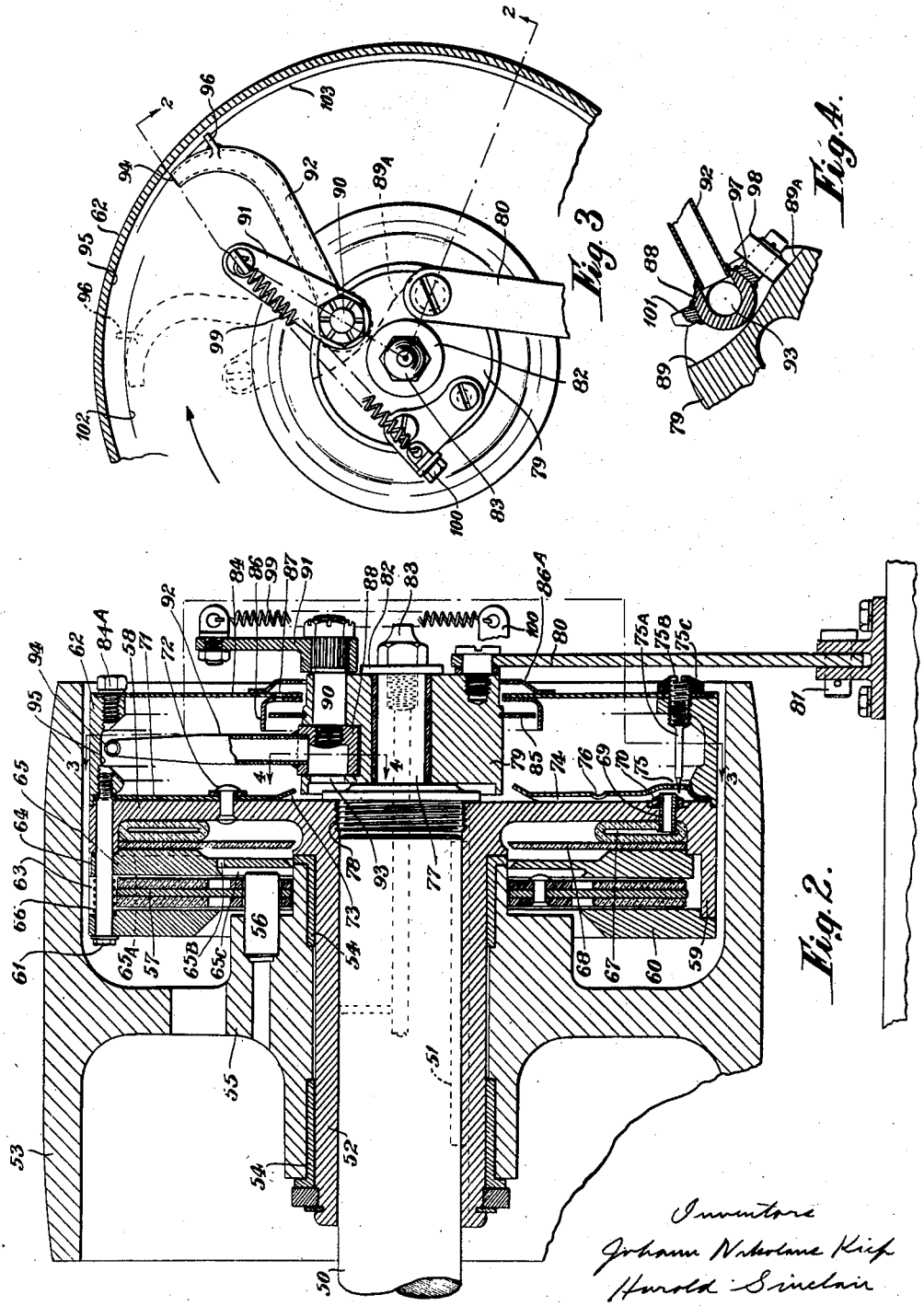

Patented Aug. 6, 1940

2,210,416

UNITED STATES PATENT OFFICE 2,210,416

FRICTION CLUTCH

Johann Nikolaus Kiep, Hamburg-Hochkamp, Germany, and Harold Sinclair, Kensington, London, England Application November 25, 1939, Serial No. 306,044
In Great Britain November 16, 1938

23 Claims. (Cl. 192—85)

This invention relates to rotary clutches which engage automatically when the driving element is accelerated.

An object of this invention is to provide an improved friction clutch of the kind in which the engaging pressure on the co-operating friction elements is generated by centrifugal force exerted by a body of liquid rotating co-axially with the clutch elements.

Another object is to provide a clutch of this kind which is self-contained, and which is provided with improved control means which eliminate risk of excessive slip to which centrifugal clutches are usually liable at their engaging speeds.

A further object is to provide such a centrifugal clutch which normally operates automatically, but which, if desired, can also be actuated by a supplementary control which over-rides the automatic control.

Another object is to provide a liquid actuated centrifugal friction clutch in which provision is made for dissipating by means of the actuating liquid the heat generated at the friction surfaces.

Another object is to provide a centrifugal clutch which is completely disengaged until its driving element attains nearly its maximum speed, whereupon the clutch engages progressively up to the fully engaged condition, this arrangement being especially suitable for use as an automatic starting clutch for electric motors, in particular single-phase machines which have a weak starting torque.

According to this invention, a clutch of the kind hereinbefore set forth comprises a rotary centrifugal pressure chamber for containing the body of liquid which generates the engaging pressure, a rotary reservoir chamber, a drain passage which is adapted to discharge liquid under the influence of centrifugal force from said pressure chamber to said reservoir chamber, and scooping means for returning liquid from said reservoir chamber to said pressure chamber.

The drain passage may be so positioned that liquid in draining through it is adapted to abstract heat from the cooperating friction elements of the clutch.

The scooping means may be displaceable or provided with a controllable or automatic valve, whereby the flow of liquid from the reservoir chamber to the pressure chamber can be regulated.

Figure 1:
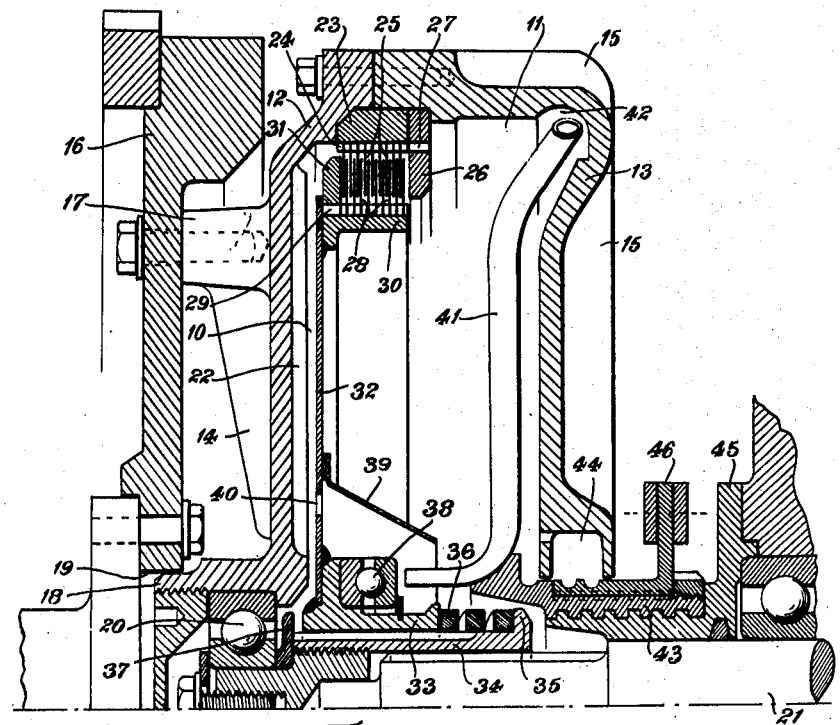
Figure 5:
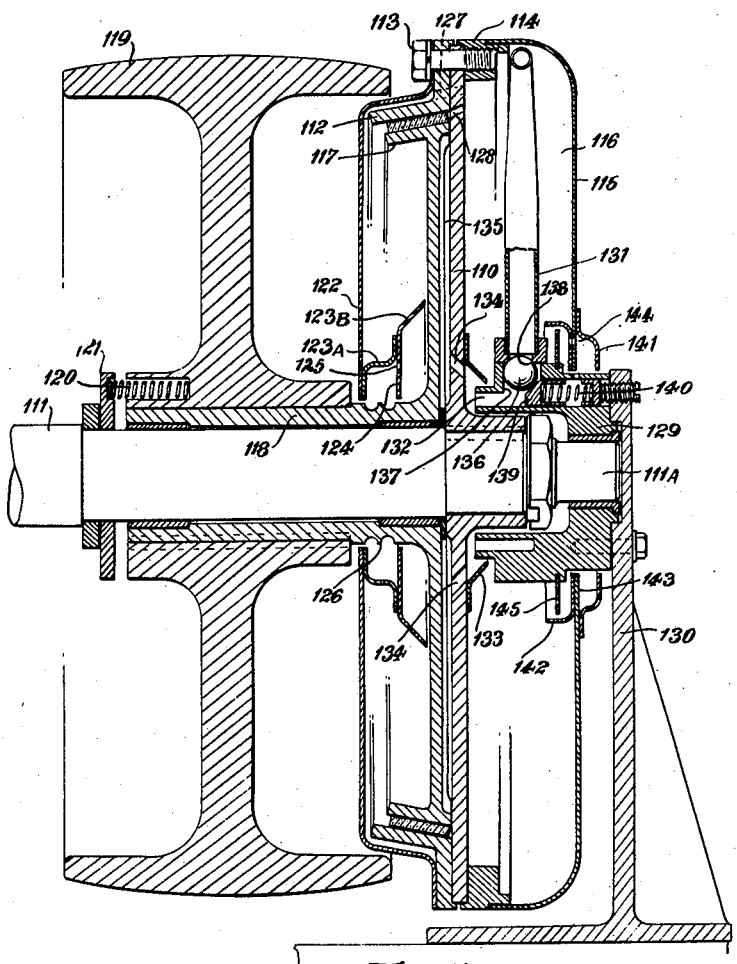

Other objects and advantages of the invention will be apparent from the following description of three embodiments thereof with reference to the accompanying drawings, in which:

Fig. 1 is a diagrammatic sectional side elevation of the upper half of a clutch suitable for automotive vehicles, Fig. 2 is a sectional side elevation of a starting clutch for an electric motor, taken on the line 2—2 in Fig. 3, Fig. 3 is a section taken approximately on the line 3—3 in Fig. 2, Fig. 4 is a section of a detail, taken on the line 4—4 in Fig. 2, and Fig. 5 is a diagrammatic sectional side elevation of part of another example of starting clutch.

In the example shown in Fig. 1 the driving clutch part includes a pressure chamber 10 and a reservoir chamber 11 contained within drums 12 and 13 which are flanged together at their outer periphery. Both drums 12 and 13 are preferably of aluminum or magnesium alloy or any suitable material of high heat conductivity and may each be provided with external cooling fins 14 and 15 for augmenting the transfer of heat from their walls to the atmosphere. The pressure chamber drum 12 is fixed to an engine flywheel 16 by means of screws engaging in lugs 17 projecting from its outer surface and a boss 18 spigoted in a locating hole 19 in the centre of the flywheel 16. The boss 18 houses a ball bearing 20 indirectly supporting the driven clutch shaft 21. The forward wall of the drum 12 may be provided with internal ribs 22 for assisting the setting in rotation of the liquid therein and the transfer of heat from the liquid to its walls and thus to the atmosphere.

The reservoir chamber 13 is of deeper section at its outer periphery than the pressure chamber drum, so that when rotating it can accommodate the whole or at least the greater part of the liquid from the pressure chamber in the form of a rotating ring, the inner diameter of which is equal to or greater than the external diameter of the driven friction plates. Between the drums 12 and 13 is clamped a ring 23 which projects into their interior and which is provided with axial grooves 24 on its inner periphery. This ring forms the driving carrier for the driving friction plates 25 which are flat rings provided with axial splines at their outer edges which engage in the grooves 24. Together with and behind the ring 23 is also clamped between the drums 12 and 13 a driving abutment plate 26, provided with small axial drain holes 27 disposed at substantially the same radius as the grooves 24 of the driving carrier ring and leading from the pressure chamber 10 to the reservoir chamber 11.

The driven clutch part includes driven friction plates 28 which interlace with the driving plates 25 and which are flat rings provided with axial splines at their inner edge. These engage in grooves 29 formed in the outer edge of a grooved ring 30 which forms the driven carrier and which is rigid with a driven pressure plate 31. The parts 30 and 31 are fixed in a fluid-tight manner to an annular driven disk 32. The driven friction plates 28 and 31, the driven carrier ring 30 and the driven disk 32 together form the rear wall of the pressure chamber 10 and thus the partition between this and the reservoir chamber 11.

The driven disk 32 is fixed to a hub 33 which is splined to and axially slidable on a sleeve 34. The rear end of the sleeve 34 has an integral collar 35 and is splined to the driven shaft 21. The forward end of the sleeve 34 is attached to the inner race of the ball bearing 20, which is preferably of the deep-grooved type in order to be able to take up axial thrust. Between the rear end of the hub 33 and the collar 35 there is a helical spring 36 which tends to force the hub 33 against a ring 37 clamped with the inner race of the ball bearing 20 and to keep the clutch disengaged. The spring 36 is so dimensioned that disengagement takes place when, owing to a low speed of rotation of the driving clutch part, the centrifugal liquid pressure in the pressure chamber 10 is insufficient to overcome the spring force. The hub 33 carries a thrust ball bearing 38, and around this an annular conical ring 39 is fixed to the driven disk 32. This ring serves as a collecting chamber for the liquid passing from the reservoir to the pressure chamber and delivers this to the latter by holes such as 40 in the driven disk.

Transfer of the liquid from the reservoir to the collecting chamber takes place when the driving clutch part is rotating and is effected by utilising the stored energy of the liquid ring rotating inside and together with the reservoir chamber. The liquid transfer means are mounted on a fixed clutch part and include one or more radially projecting scoop tubes such as 41. The mouth of the scoop tube is accommodated in a circumferential groove 42 in the periphery of the reservoir drum. It inner end projects into the collecting cone 39 at a radius substantially equal to the mean radius of the thrust ball bearing 38 and at a distance sufficient to permit free flow from the tube between the tube end and the rear face of the ball race.

The total scoop tube area is such that, when the driving clutch part is rotating, the scoop tube can deliver not only more liquid to the collecting cone and thus to the pressure chamber 10 than flows from this chamber to the reservoir chamber 11 through the drain holes 27, but also any liquid which during engagement of the clutch may escape by other means from the pressure chamber to the reservoir chamber.

The inner end of the scoop tube is fixed to an internally screw-threaded control sleeve 43 which passes through a labyrinth gland 44 in the centre of the drum 13. The control sleeve is engaged on a fixed externally screw-threaded carrier 45 and is provided with a control lever 46. When the control sleeve is suitably turned by the lever 46, the scoop tube 41 is moved axially forward and its flattened discharge end comes in contact with and is closed by the ball bearing 38. Where only one scoop tube is provided, the control sleeve may be provided with a projection on the opposite side of the scoop tube, which is likewise adapted to engage the ball bearing. Such turning of the control sleeve while the driving clutch part is rotating, therefore, first causes the flow of liquid from the scoop tube to the collecting chamber to be interrupted and then axial displacement of the driven disk hub 33 and thus disengagement of the clutch.

This example operates as follows.

When the control lever 46 is in the position shown in Fig. 1, the sleeve 43 being in its rearmost position, and when the engine is running, the scoop tube 41 picks up liquid from the reservoir chamber 11 and discharges it within the cone 39, whence it passes through the holes 44 into the pressure chamber 10. Since the flow of liquid delivered by the scoop exceeds the discharge through the drain holes 27, the pressure chamber 10 fills with liquid which, under the influence of centrifugal force, urges the disk 32 to the rear. Thus, when the engine speed is high enough, the pressure due to the liquid overcomes the force exerted by the disengaging spring 36 and engages the clutch automatically. When the engine speed falls below a critical value, the pressure due to the liquid becomes less than the spring pressure and the clutch disengages automatically. When the control lever is so set that the clutch operates automatically, there is a continuous flow of liquid from the reservoir chamber through the scoop to the pressure chamber, and thence past the friction plates and through the drain holes 27 back to the reservoir chamber. Since the circulating liquid flows over the ribbed walls of the drums 12 and 13, it gives off these parts the heat generated at the friction surfaces.

The clutch can be disengaged, when the engine speed is high, by actuating the control lever 46 so as to displace the control sleeve 43 axially forwards, until the discharge end of the scoop tube 41 engages the ball bearing 38, which interrupts the flow of liquid to the pressure chamber. If it is desired to disengage the clutch more quickly than it would disengage in consequence of the escape of liquid through the drain holes 27, the control lever 46 can be actuated further so as to cause the discharge end of the scoop tube to displace the driven hub 33 axially forwards against the force of the liquid in the pressure chamber.

As operating liquid there may be employed a lubricating oil, or a heavier liquid, for example glycerine, or the liquid supplied by the Monsanto Chemical Company under the trade-mark "Aroclor."

Figs. 2 and 3 show an automatic starting clutch for use for example with alternating-current electric motors of the kind which requires the attainment of nearly full speed before any substantial load is applied. In this example the scooping action is automatically delayed until the driving part of the clutch has accelerated to a predetermined speed.

On the motor shaft 50 is fixed a cast-iron hub 52 which is forced on the shaft and constrained to rotate therewith by a key 51. A pulley 53 is journalled on the hub 52 by bushes 54. In the boss 55 of the pulley are fixed a plurality of driving pins, such as 56, on which is slidably fitted a driven friction plate 57. The hub 52 is provided with a driving flange 58 having at its periphery a cylindrical flange 59. An annular driving plate 60 is fixed against the rim 59 by screws such as 61 engaging in a cast-iron reservoir rim 62. The rim 59 is gapped in way of the screws 61, as at 63, and the gaps 63 accommodate radially slotted projections 64 on a presser plate 65, the projections 64 embracing the screws 61. Helical springs 66 mounted on the screws 61 are compressed between the plates 60 and 65 and tend to keep the clutch disengaged.

The pressure chamber comprises an annular flexible bag 67, made for example of rubberized fabric (such as is employed for landing brakes of aircraft) and accommodated between the driving flange 58 and the presser plate 65, a shield ring 68 of heat-insulating material being interposed between the bag 67 and the plate 65. One or more screw-threaded nipples such as 69, pass through the flange 58 and are secured in a fluid-tight manner in apertures in the bag 67 by means of nuts 70. An annular collector plate 71 is fixed close to the flange 58 by the screws 61 and by rivets such as 72, the inner edge of this plate being coned to form a collector channel 73. The plate 71 is provided with a suitable number of radial indentations, such as 74, which communicate between the channel 73 and the nipples 69 and which form a portion of the pressure chamber. A small drain hole 75 is formed in the plate 71 at the outer end of each indentation 74, and the effective area of this drain can be regulated by a needle 75A extending from an adjusting screw 75B which is engaged in a reservoir end wall 84 and locked by a nut 75C. There may be provided a larger hole 76 at any desired position along the indentation 74, which position determines the centrifugal head of the liquid in the pressure chamber.

A shaft extension 77 is screwed to the end of the hub 52 at 78 and forms a bearing for a cast-iron scoop housing 79 which is provided with an oil-less bush and which is prevented from rotating by a link 80 attached at 81 to the motor bed plate. The housing 79 is located axially by a washer 82 retained by a lubricating nipple 83. The reservoir end wall 84 is secured by screws, such as 84A to the ring 62 and is sealed with respect to the housing 79 by a labyrinth gland including an annular disk 85 fixed to the housing and accommodated within a tubular baffle 86 fixed to the inner side of the wall 84. The tubular baffle is extended by a tubular cap 86A fixed on the outer side of the wall 84, which is perforated by drain holes, such as 87 adjacent to the tubular baffle.

A scoop-tube boss 88 is accommodated in a transverse channel 89 formed in the housing 79 and is fixed to a control pin 90 journalled in the housing and in turn fixed to a control lever 91. The scoop tube 92 communicates through the hollow boss 88 with a port 93 in the front of the housing 79 and leading to the collector channel 73. The mouth 94 of the scoop tube is adapted to lie in a circumferential channel 95 in the interior of the reservoir ring 62. The scoop tube is provided with a drag lug 96 which is also adapted to lie in the channel 95. The scoop-tube boss 88 is provided with a stop arm 97 (Fig. 4) on which is mounted a cushioning member, for example a rubber ring 98, adapted to engage an abutment surface 89A on the base of the channel 89, as the mouth of the scoop tube attains its radially outermost position shown in full lines in Fig. 3 (hereinafter termed the "operative position") when being displaced in the same direction as the direction of rotation of the ring 62. One end of a tension control spring 99 is pivotally connected to the control arm 91, its other end being connected to an anchorage lug 100 mounted on the housing 79. The spring 99 urges the scoop tube towards the radially innermost position shown in dotted lines in Fig. 3 (hereinafter termed the "inoperative position"); and a lug 101 on the boss 88 by abutting against the base of the channel 89 prevents the scoop tube from moving further radially inwards.

The lubricator 83 serves to lubricate the pulley bushes 54, and any lubricant which exudes from the bush nearer the flange 58 escapes from the clutch through a radial channel 65A formed in the flange 65. A circumferential channel 65C traps any lubricant that may approach the friction face of the plate 65 and delivers it through a port 65B to the channel 65A.

This example, which, with a pulley diameter of 10 inches, is suitable for transmitting 25 horse-power at 1450 R. P. M., operates as follows.

When the clutch is assembled, about 1½ lbs. of mercury is placed in the reservoir chamber to serve as working liquid. When the motor is started (the direction of rotation being shown by the arrow in Fig. 3), the mercury forms a ring in the channel 95, its inner surface being denoted by 102 in Fig. 3. At first the scoop tube is held by the spring 99 in its inoperative position with its mouth clear of the liquid and the drag lug 96 dipping into the liquid. Under these conditions the control arm 91 lies at a substantial angle to the axis of the control spring 99, so that the control torque resisting displacement of the scoop tube has a relatively high value.

When the motor speed attains a suitable value, for example between 90 and 95 per cent. of the synchronous speed, the torque imposed on the scoop tube by the drag of the liquid on the lug 96 exceeds the control torque due to the spring 99, with the result that the scoop tube is displaced to its operative position, its mouth becoming immersed in the liquid. The control arm 91 now lies at a considerably reduced angle to the axis of the spring 99, with the result that the control torque imposed by this spring is reduced to a relatively low value and risk of "hunting" of the scoop tube is thereby eliminated. As the scoop tube attains its operative position, the buffer ring 98 engages the abutment 89A, cushioning the shock due to the arresting of the scoop tube and thereby avoiding risk of its bending or fracture.

The liquid picked up by the scoop tube passes through the port 93 to the collector channel 73 and thence to the pressure chamber comprising the indentations 74 and the bag 67. The effect of centrifugal force on the liquid expands the bag 67, forcing the presser plate 65 towards the plate 60 and thereby fully engaging the clutch. Thereafter a restricted leakage of liquid from the pressure chamber to the reservoir chamber occurs through the holes 75, and the remainder of the flow through the scoop escapes through the holes 76; the liquid level in the reservoir chamber under these conditions, which is denoted by 103, is such that the mouth 94 of the scoop tube is immersed deeply enough to retain the scoop tube in its operative position.

When the motor has been switched off and its speed falls to a predetermined value lower than that at which the clutch engaged, the torque due to the force of the liquid impinging on the mouth 94 becomes less than the control torque due to the spring 99 and the scoop tube returns to its inoperative position, as shown by dotted lines in Fig. 3. The liquid in the pressure chamber escapes through the holes 75, allowing the bag 67 to be collapsed by the pressure of the clutch disengaging springs 66.

This clutch has the following advantages. It enables the motor to run up almost to full speed without any load, whereupon the scoop tube is moved with a snap action to its operative position. The full engaging force on the friction surfaces is now built up at any desired rate, determined by the ratio of the flow capacity of the scoop tube to that of the escape holes. As soon as the circulation conditions reach equilibrium, the clutch is in condition to transmit its full working torque. Consequently the slipping that occurs is no more than is necessary to enable the load to be smoothly accelerated. Similarly, when the motor is switched off, the clutch rapidly and completely disengages, the period of slipping being negligibly short.

The example shown diagrammatically in Fig. 5 is an "Aroclor" actuated cone clutch, also suitable for use as an automatic starting clutch for an electric motor. A driving flange 110 is fixed to the motor shaft 111. A clutch driving conical ring 112 is fixed to the flange 110 by screws such as 113 engaging in a ring 114. A clutch driven conical member 117 is rigid with a hub 118 of a pulley 119, this hub being rotatable and slidable on the shaft 111. Springs such as 120 are compressed between the hub 118 and a thrust collar 121 journalled on the shaft 111 and these springs bias the clutch towards its disengaged condition. A dished and apertured casing 122 secured by the screws 113 encloses the clutch, being sealed with respect to the hub 118 by a labyrinth gland including a built-up tube 123A, 123B having an internal flange 124 provided with drain ports such as 125 near its periphery. The hub 118 is provided with a liquid thrower ring 126 positioned to discharge into the space between the casing 122 and the flange 124. Drain ports such as 127 pass through the flange 110 and the ring 112 from the outermost part of the space contained by the casing 122, and a restricted drain hole 128 passes through the flange 110 adjacent to the friction surface of the ring 112.

A boss 129 is journalled on an extension 111A of the motor shaft and is fixed to a bracket 130 which prevents it from rotating. A scoop tube 131 is fixed to the boss 129 and communicates through an automatic valve with a port 132 formed in the inner end of the boss 129 and opening within a collector cone 133 fixed to the flange 110. Ports 134 lead from the interior of this cone to the pressure chamber 135 formed between the flange 110 and the clutch driven member 117. The automatic valve includes a ball 136 accommodated in a cylindrical bore 137 and urged against a seating 138 by a wedge 139 which is biased by an adjustable compression spring 140. The shell 115 is sealed with respect to the boss 129 by a labyrinth gland including a flange 145 fixed to the boss 129 and a built-up tubular portion 141, 142 containing an internal flange 143 having drain ports such as 144 through its outer margin.

This clutch operates as follows, it being assumed that working liquid has been inserted into the reservoir chamber 116 through a filling plug (not shown).

When the motor is started, the springs 120 at first keep the clutch disengaged, and the liquid forms in the reservoir chamber a ring into which the scoop tube dips. The valve ball 136 is at first kept on its seat 138 by the wedge 139, so that no liquid is discharged by the scoop tube. When, however, the motor speed attains a suitable high value, the fluid pressure in the scoop tube acting on the area of the ball 136 exposed through the seating 138 exerts a force sufficient to lift the ball off this seating against the biasing force exerted by spring 140 on the wedge 139 and against the friction between the wedge and the parts against which it slides. Liquid is thereupon discharged through the narrow clearance space between the ball and the bore 137 and thence through the port 132 to the cone 133. The valve is so proportioned that it has a "pop" action—that is to say, the said clearance space is so restricted that, after the ball has been raised from its seating, the fluid pressure, which now acts on the whole projected area of the ball, exerts on it a force substantially exceeding the force exerted by the spring 140 which tends to return it to its seating and which is reduced by the effect of the friction acting between the wedge and the parts along which it slides. There is therefore no risk of "hunting" of the valve.

Liquid discharged by the scoop tube into the cone 133 passes through the ports 134 into the pressure chamber 135 faster than liquid can escape from the pressure chamber between the friction surfaces of the clutch parts 112 and 117 and through the drain hole 128. Consequently the pressure chamber fills with liquid, the centrifugal force on which causes a fluid pressure which displaces the clutch driven parts 117, 118 and 119 against the action of the springs 120 into a position such that the friction surfaces of the clutch are engaged together. The clutch is thus fully engaged without any unnecessary slipping. When the motor has been switched off, as soon as its speed falls to a predetermined value, the spring 140 closes the ball valve and interrupts the delivery of liquid by the scoop tube to the pressure chamber, which thereupon empties through the drain hole 128 to the reservoir chamber, so that the clutch rapidly disengages under the influence of the springs 120.

We claim:

1. A rotary friction clutch of the kind in which the engaging pressure on the co-operating friction elements is generated by centrifugal force exerted by a body of liquid rotating co-axially with the clutch elements, the clutch comprising a rotary centrifugal pressure chamber for containing the body of liquid which generates the engaging pressure, a rotary reservoir chamber, said chambers communicating by a drain passage for discharging liquid under the influence of centrifugal force from said pressure chamber to said reservoir chamber, and scooping means for returning liquid from said reservoir chamber to said pressure chamber.

2. A rotary friction clutch of the kind in which the engaging pressure on the co-operating friction elements is generated by centrifugal force exerted by a body of liquid rotating co-axially with the clutch elements, the clutch comprising a rotary centrifugal pressure chamber for containing the body of liquid which generates the engaging pressure, a rotary reservoir chamber, means for discharging liquid from said pressure chamber to said reservoir chamber, and speed-responsive liquid-transfer means for discharging liquid from said reservoir chamber to said pressure chamber.

3. A friction clutch comprising a rotary driving element, a rotary driven element, co-operating friction surfaces on said elements, a rotary pressure chamber capable of deformation under the influence of centrifugal force acting on liquid contained therein to effect engagement of said friction surfaces together, a reservoir chamber arranged to rotate with said driving element, and means responsive to the speed of said driving element for transferring liquid from said reservoir chamber to said pressure chamber in consequence of the rising of said speed to a predetermined value.

4. A friction clutch comprising a rotary driving element, a rotary driven element, co-operating friction surfaces on said elements, a rotary pressure chamber capable of deformation under the influence of centrifugal force acting on liquid contained therein to effect engagement of said friction surfaces together, a reservoir chamber arranged to rotate with said driving element, means for discharging liquid from said pressure chamber to said reservoir chamber, scooping means for engaging liquid in said reservoir chamber and transferring it to said pressure chamber, and means for rendering said scooping means operative and inoperative.

5. A friction clutch comprising a rotary driving element, a rotary driven element, co-operating friction surfaces on said elements, a rotary pressure chamber capable of deformation under the influence of centrifugal force acting on liquid contained therein, to effect engagement of said friction surfaces together, a reservoir chamber arranged to rotate with said driving element, means for draining liquid from said pressure chamber to said reservoir chamber, scooping means in said reservoir chamber for transferring liquid therefrom to said pressure chamber, means for disengaging said clutch mechanically, and a control member associated with said scooping means and said disengaging means and capable on initial operation of interrupting the transfer of liquid by said scooping means and on continued operation of actuating said disengaging means.

6. A friction clutch comprising a rotary driving element having a friction face thereon, a driven element displaceable axially relatively to said driving element and having a friction face for co-operating with said first-mentioned friction face, said elements together forming a pressure chamber for containing liquid which, under the influence of centrifugal force, urges said elements in such a sense as to engage said friction faces together, means for discharging liquid from said pressure chamber across said friction faces, and means for collecting liquid so discharged and returning it to said pressure chamber.

7. A friction clutch comprising a rotary driving element, a rotary driven element, co-operating friction surfaces on said elements, a rotary pressure chamber capable of deformation under the influence of centrifugal force acting on liquid contained therein, to effect engagement of said friction surfaces together, a reservoir chamber arranged to rotate with said driving element, said chambers communicating by a drain passage for discharging liquid from said pressure chamber, a scoop tube in said reservoir chamber, a duct for conveying liquid from said scoop tube to said pressure chamber, and valve means for controlling the flow through said duct.

8. A friction clutch comprising a rotary driving element having an annular friction face thereon, a driven element axially displaceable relatively to said driving element and having an annular friction face thereon, said elements together enclosing a pressure chamber for containing liquid which, under the influence of centrifugal force, tends to deform said chamber and so engage said friction faces together, a reservoir chamber said friction faces together, a reservoir chamber arranged to rotate with said driving element and having a diameter exceeding that of said pressure chamber, there being a drain passage in the neighbourhood of the periphery of said pressure chamber and opening to said reservoir chamber, and scooping means in said reservoir chamber for returning liquid therefrom to said pressure chamber.

9. A clutch capable of engagement automatically in consequence of the speed of the driving element thereof rising to a predetermined value, said clutch comprising a reservoir chamber arranged to rotate with said driving element, a non-rotatable support, a scoop tube in said reservoir chamber and journalled on said support so as to be capable of displacement about an axis parallel to the axis of said clutch, a duct leading from said scoop tube to a working chamber, biasing means urging said scoop tube in such a sense that its lip will move oppositely to the normal direction of rotation of the adjacent portion of said reservoir chamber and radially inwards from the periphery thereof, a stop limiting such movement of said scoop at a position such that a relatively small portion of the scoop will engage a ring of liquid in the reservoir chamber when said driving element is rotating, said biasing means exerting on said scoop a torque which is equal to the torque due to the engagement of said ring of liquid on said small portion of the scoop when the speed of said driving element has a predetermined value less than its maximum value, and a cushioned stop for arresting displacement of said scoop tube in the sense in which its lip moves in the normal direction of rotation of the adjacent portion of said reservoir chamber and radially towards the periphery thereof, whereby the scoop tube will discharge liquid to said working chamber and thereby engage said clutch.

10. In an automatic clutch engaged by the transfer of liquid from a rotary reservoir chamber to a rotary working chamber thereof, a fixed support, a scoop tube in said reservoir chamber and journalled on said support about an axis parallel to the axis of rotation of said reservoir chamber so as to be displaceable between an operative position in which the lip of the scoop tube is adjacent the periphery of said reservoir chamber and an inoperative position in which said lip is more remote from said periphery and only a relatively small part of said scoop tube engages a ring of liquid in said reservoir chamber, automatic control means biasing said scoop from said operative to said inoperative position and in such a sense that its lip moves oppositely to the normal direction of rotation of the adjacent portion of said reservoir chamber and in such a manner that the torque imposed on said scoop tube by the liquid to displace it from its inoperative position is higher than the torque imposed by the liquid to retain it in its operative position, and a cushioned stop positioned to arrest said scoop tube as it attains said operative position.

11. A friction clutch comprising a rotary driving element having an abutment, an axially displaceable presser element and an annular resilient bag disposed between said abutment and said presser element, a rotary driven element capable of being frictionally engaged co-axially with said driving element on displacement of said presser element, a reservoir chamber for liquid rotatable with said driving element, a duct disposed at least in part radially outwards with respect to the axis of said elements and leading from said reservoir chamber to said bag, and means for transferring liquid from said reservoir chamber to said duct in response to rotation of said driving element.

12. A friction clutch comprising a rotary driving element having an abutment, an axially displaceable presser element and a pressure chamber comprising an annular resilient bag disposed between said abutment and said presser element and a duct disposed at least in part radially inwards from said bag towards the axis of said driving element, a driven element capable of being frictionally engaged with said driving element on displacement of said presser element, a reservoir chamber rotatable with said driving element and communicating with the inner end of said duct, the radius of said reservoir chamber exceeding the distance between the radially inner end of said duct and said axis, means for engaging liquid in said reservoir chamber and transferring it to said duct, and mercury contained within the enclosed space constituted by said chambers.

13. A friction clutch comprising a rotary driving element, a rotary driven element, co-operating friction surfaces on said elements, a rotary pressure chamber capable of deformation under the influence of centrifugal force acting on liquid contained therein to effect engagement of said friction surfaces together, a reservoir chamber arranged to rotate with said driving element, means for discharging liquid from said pressure chamber to said reservoir chamber, a fixed support penetrating an aperture disposed centrally in the wall of said reservoir chamber, a labyrinth gland sealing said wall with respect to said support at said aperture, a scoop tube journalled on said support eccentrically with respect to the axis of said clutch for transferring liquid to said pressure chamber, stops for limiting displacement of said scoop in inoperative and operative positions such that as the scoop moves to its operative position its mouth is displaced in the same direction as the part of a liquid ring in said reservoir that is engaged by said scoop and when said scoop is inoperative a relatively small part thereof is engaged by said liquid ring, and means biasing said scoop towards its inoperative position.

14. In an automatic clutch engaged by the transfer of liquid from a rotary reservoir chamber to a rotary working chamber thereof, a non-rotatable support, and a scoop tube in said reservoir and held by said support for engaging liquid in said reservoir chamber during rotation thereof, said scoop tube communicating with said working chamber through a loaded valve set to open under the influence of the fluid pressure due to the scooping action when the speed of said reservoir chamber rises to a predetermined value.

15. In an automatic clutch engaged by the transfer of liquid from a rotary reservoir chamber to a rotary working chamber thereof, a non-rotatable support, and a scoop tube in said reservoir and held by said support for engaging liquid in said reservoir chamber during rotation thereof, said scoop tube communicating with said working chamber through a spring-loaded valve having a "pop" characteristic such that it will open under the influence of the fluid pressure due to the scooping action at a particular speed of rotation of said reservoir chamber when the liquid content of said reservoir chamber is the maximum and will close only when the fluid pressure has dropped to a value lower than that existing at the same speed of rotation when the liquid content of said reservoir chamber is the minimum.

16. A clutch comprising a rotary driving element, a deformable pressure chamber bounded at least in part by a wall constrained to rotate with said driving element, a rotary driven element adapted to be frictionally engaged with said driving element, in consequence of deformation of said chamber under the influence of centrifugal force acting on liquid contained therein, a reservoir chamber constrained to rotate with said driving element, said pressure chamber having a port in the neighborhood of the periphery thereof and leading to said reservoir chamber for discharging liquid from the pressure to the reservoir chamber under the influence of centrifugal force, and liquid transfer means for delivering liquid from said reservoir chamber to said pressure chamber in response to rotation of said driving element.

17. A clutch comprising a rotary driving element, a deformable pressure chamber bounded at least in part by a wall constrained to rotate with said driving element, a rotary driven element adapted to be frictionally engaged with said driving element, in consequence of deformation of said chamber under the influence of centrifugal force acting on liquid contained therein, a reservoir chamber constrained to rotate with said driving element, and having a diameter exceeding that of said pressure chamber, there being a drain port for discharging liquid under the influence of centrifugal force from said pressure chamber to said reservoir chamber, and liquid transfer means in said reservoir chamber which are responsive to the speed of rotation of said driving element and which serve to deliver liquid to said pressure chamber, at a rate exceeding the rate of drainage to said reservoir chamber, only when the speed of said driving element rises to a predetermined value.

18. In combination, a motor shaft, a clutch driving element constrained to rotate with said shaft, a pulley co-axial with and rotatable on said shaft, a deformable pressure chamber having at least part of its boundary wall constituted by an element constrained to rotate co-axially with said driving element, a driven element constrained to rotate with said pulley and capable of being frictionally engaged with said driving element in response to deformation of said pressure chamber, a reservoir chamber constrained to rotate with said shaft, a support journalled co-axially with said shaft in said reservoir chamber, means for preventing rotation of said support, and liquid transfer means mounted on said support for engaging liquid in said reservoir chamber and delivering it to said pressure chamber in response to rotation of said shaft.

19. In combination, an electric motor having a shaft, a rotary driving element constrained to rotate with said shaft, a rotary driven element, co-operating friction surfaces on said elements, a rotary pressure chamber capable of deformation under the influence of centrifugal force acting on liquid contained therein to effect engagement of said friction surfaces together upon rotation of said shaft, a reservoir chamber extending radially from the axis of rotation of said shaft beyond the maximum radius of said pressure chamber and capable of receiving the liquid content of the latter chamber discharged therefrom by centrifugal force, and liquid transfer means responsive to the speed of said shaft for delivering liquid from said reservoir chamber to said pressure chamber upon the speed of said shaft rising to a predetermined value.

20. In combination, an electric motor having a shaft, a friction clutch mounted on said shaft and comprising a centrifugal pressure chamber which is deformable to engage the clutch under the influence of centrifugal force acting on liquid contained in said chamber, a reservoir chamber rotatable with said shaft, an extension of said shaft penetrating said reservoir chamber, a liquid transfer member journalled on said shaft extension for engaging liquid in said reservoir chamber, said member communicating with said pressure chamber, and means for restraining rotation of said transfer member.

21. A friction clutch comprising a rotary driving element, a rotary driven element, said elements having co-operating friction surfaces, a rotary pressure chamber of which at least a part of the boundary wall is constrained to rotate with said driving element and which is capable of deformation under the influence of centrifugal force acting on liquid contained therein to effect engagement of said friction surfaces together, a reservoir chamber constrained to rotate with said driving element, a leakage port for discharging liquid under the influence of centrifugal force from said pressure chamber to said reservoir chamber, the effective area of said leakage port being adjustable, and means for transferring liquid from said reservoir chamber to said pressure chamber in response to rotation of said driving element.

22. A friction clutch comprising a rotary driving element, a rotary driven element, said elements having co-operating friction surfaces, a rotary pressure chamber of which at least a part of the boundary wall is constrained to rotate with said driving element and which is capable of deformation under the influence of centrifugal force acting on liquid contained therein to effect engagement of said friction surfaces together, a reservoir chamber constrained to rotate with said driving element, a leakage port disposed in the neighbourhood of the periphery of said pressure chamber and leading to said reservoir chamber for discharging liquid thereto under the influence of centrifugal force, an inlet disposed in the neighbourhood of the radially inner part of said pressure chamber for admitting liquid thereto, means responsive to rotation of said driving element for transferring liquid from said reservoir chamber into said inlet, and a port debouching from said pressure chamber at a point between said leakage port and said inlet for discharging excess liquid to said reservoir chamber.

23. A centrifugal clutch comprising a rotary driving element having an abutment and a presser element constrained to rotate with but axially displaceable relatively to said abutment, a driven part having a bearing on said driving element, means for supplying lubricant to said bearing, co-operating friction surfaces on said driven part and said presser element, a resilient annular bag disposed between said abutment and said presser element for containing liquid which serves under the influence of centrifugal force to displace said presser element and thereby engage said friction surfaces, a shield interposed between said bag and said presser element and positioned to prevent excess lubricant that exudes from said bearing from reaching said bag, and a duct formed at least in part radially in said driving element to discharge such excess lubricant.

JOHANN NIKOLAUS KIEP.
HAROLD SINCLAIR.